United States Patent
Szor et al.

(10) Patent No.: US 7,607,173 B1
(45) Date of Patent: Oct. 20, 2009

(54) METHOD AND APPARATUS FOR PREVENTING ROOTKIT INSTALLATION

(75) Inventors: Peter Szor, Northridge, CA (US); Peter Ferrie, Los Angeles, CA (US); Matthew Conover, East Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 766 days.

(21) Appl. No.: 11/264,117

(22) Filed: Oct. 31, 2005

(51) Int. Cl.
*G06F 12/14* (2006.01)
*G06F 11/00* (2006.01)

(52) U.S. Cl. ............... 726/25; 726/22; 726/23; 726/24; 726/30; 713/100; 713/188

(58) Field of Classification Search ............ 726/25
See application file for complete search history.

(56) References Cited

U.S. PATENT DOCUMENTS

2007/0079178 A1* 4/2007 Gassoway .......... 714/38
2007/0079373 A1* 4/2007 Gassoway .......... 726/22

OTHER PUBLICATIONS

Keong, T.C., 'Defeating Kernel Native API Hookers by Direct Service Dispatch Table Restoration', Special Interest Group in Security and Information Integrity (SIG∧2), Oct. 3, 2004, entire document, http://www.security.org.sg/code/SIG2_DefeatingNativeAPIHookers.pdf.*
Butler, James, VICE—Catch the hookers! Black Hat, Las Vegas, Jul. 2004. www.blackhat.com/presentations/bh-usa-04/bh-us-04-butler/bh-us-04-butler.pdf.*
"IA-32 Intel® Architecture Software Developer's Manual, vol. 3: System Programming Guide", Intel Corporation, 2004, pp. 3-1-3-38 [online]. Retrieved from the Internet:<URL:http://developer.intel.ru/download/design/Pentium4/manuals/25366815.pdf>.
"IA-32 Intel® Architecture Software Developer's Manual, vol. 3: System Programming Guide", Intel Corporation, Sep. 2005, pp. 3-1-3-48 [online]. Retrieved from the Internet:<URL:ftp://download.intel.com/design/Pentium4/manuals/25366817.pdf>.

* cited by examiner

*Primary Examiner*—Christian LaForgia
*Assistant Examiner*—Ronald Baum
(74) *Attorney, Agent, or Firm*—Gunnison, McKay & Hodgson, L.L.P.; Forrest Gunnison

(57) ABSTRACT

Call to driver load functions, including associated driver objects to be loaded, are stalled and evaluated for indications of a rootkit. When a rootkit is indicated, protective action is taken, and optionally a user or system administrator are notified. Calls not indicative of a rootkit are released and allowed to load. In one embodiment, calls to currently loaded drivers and calls related to installation of new hardware, are excluded from the evaluation for indications of a rootkit. In additional embodiments, sensitive structures and calls to sensitive structures of a computer system are also evaluated for indications of a rootkit.

20 Claims, 9 Drawing Sheets

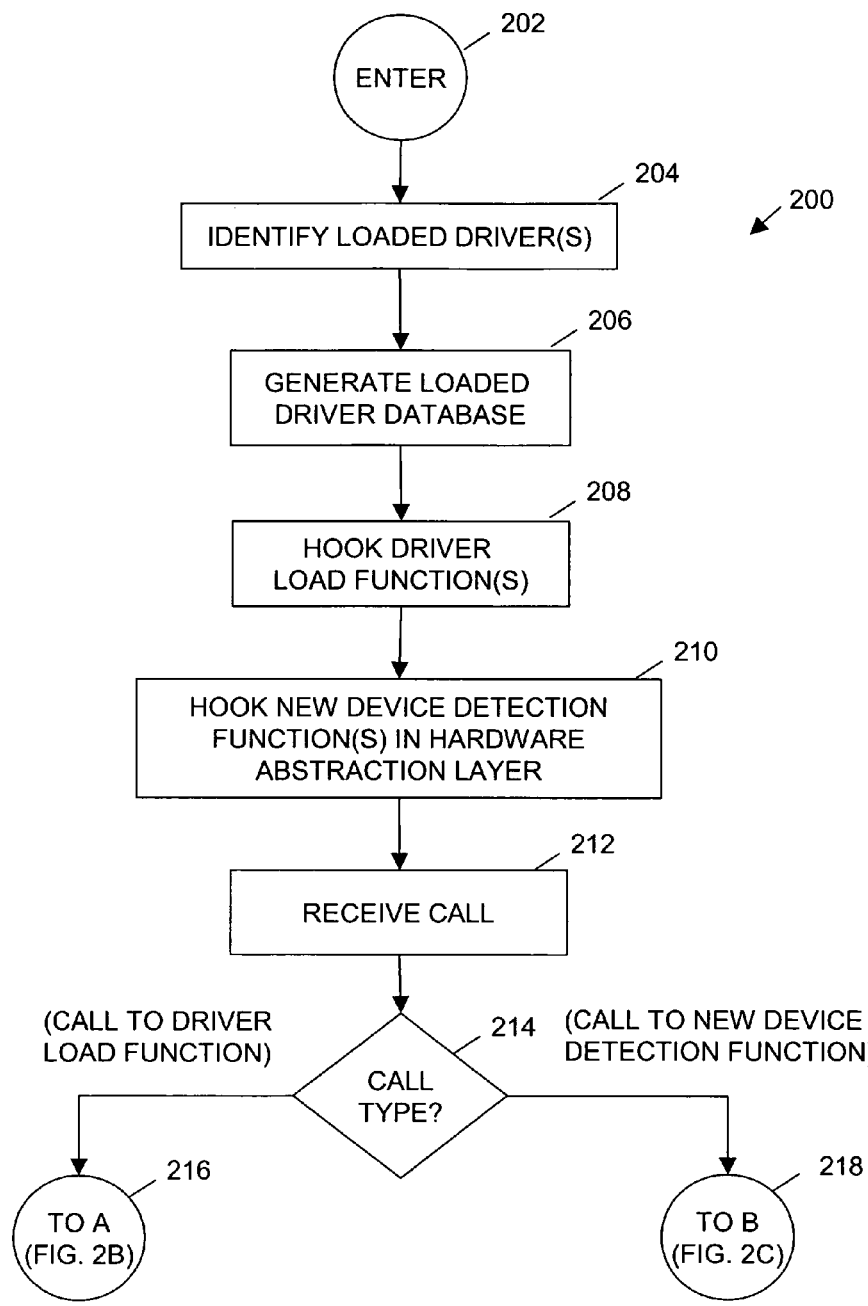

METHOD AND APPARATUS FOR PREVENTING ROOTKIT INSTALLATION

BACKGROUND OF THE INVENTION

1. Field of the Invention

The present invention relates to the protection of computer systems. More particularly, the present invention relates to prevention of rootkit installations on a computer system.

2. Description of Related Art

A rootkit can be generally described as a set of programs or codes that allows the rootkit itself, and typically some additional programs or codes, to maintain an undetectable presence on a computer. Current computer system attackers use a variety of rootkit implementations to hide their activities on a computer system. When an attacker compromises a computer system the rootkit typically maintains an access point into the computer system, e.g., a backdoor, that can be used to access the computer system and to pull discovered information out over a hidden communication channel.

In order ensure its activity and access point remains available, the rootkit typically hides its presence on the computer system. For example, some rootkits hide their files and processes, erase their activity, and alter information returned to a user or the computer system to conceal their presence on the computer system. As a rootkit is typically undetected by a user of a computer system, rootkits are typically categorized as malicious code.

Rootkits can be differentiated as falling into either user mode rootkits that operate in user mode and kernel mode rootkits that operate in the kernel mode. Kernel mode rootkits are generally viewed as a more serious threat to a computer system than user mode rootkits because the kernel's code can itself be modified and the information obtained from the kernel can no longer be trusted either by the computer system or software utilizing information obtained using kernel systems.

SUMMARY OF THE INVENTION

According to one embodiment of the invention, currently loaded drivers on a computer system are identified. A call, including a driver object, to a driver load function of the operating system is stalled and a determination is made whether the call identifies a currently loaded driver.

When the call does not identify a currently loaded driver, a determination is made whether the call is associated with a new hardware installation on the computer system. When the call is not associated with a new hardware installation, a determination is made whether the driver object is indicative of a rootkit.

When the driver object is determined to indicate a rootkit, protective action is taken, such as terminating the call. By terminating the call, the rootkit is prevented from installing on the computer system, thus preventing possible unauthorized access or other compromise of the computer system by the rootkit.

In additional embodiments, sensitive structures and/or calls to sensitive structures of a computer system are also evaluated to determine whether a rootkit is detected. When a rootkit is detected, protective action can be taken to protect the computer system.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
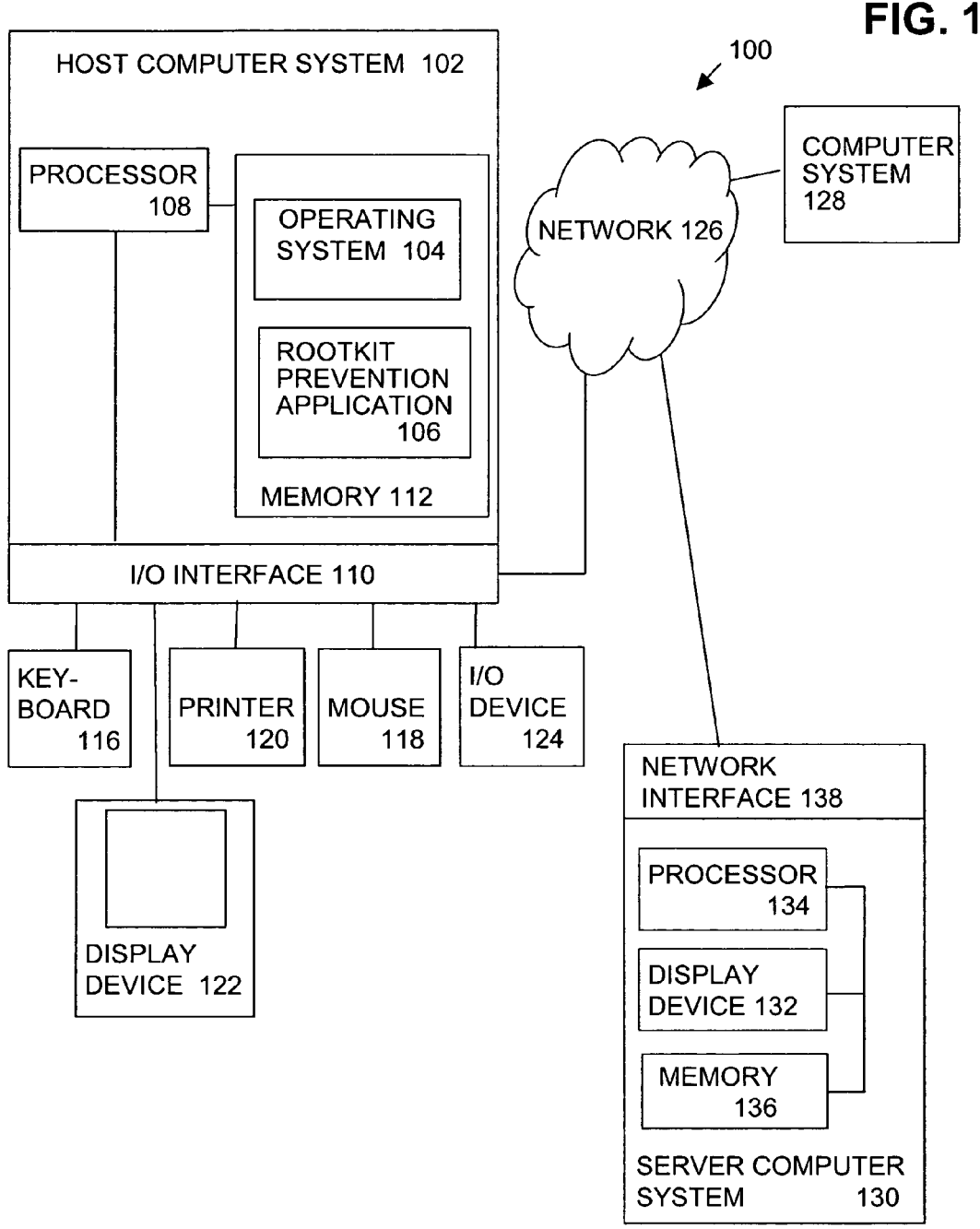
FIG. 1 is a diagram of a client-server system that includes a rootkit prevention application executing on a host computer system in accordance with one embodiment of the present invention.

The following embodiments in accordance with the invention are described with reference to a Windows operating system, such as Windows NT, however, those of skill in the art can recognize that the present invention is applicable to other operating systems as well. Herein a call includes code used to invoke a function. A call to a function specifies the function to invoke, and optionally includes parameters associated with the call. Herein a call to a driver load function also identifies a driver object, i.e., code, to be loaded.

Referring generally to FIG. 2, according to one embodiment of the present invention, a method includes identifying loaded drivers on a computer system (operation 204) and generating a loaded driver database including entries for each of the identified loaded drivers (operation 206). One or more driver load functions are hooked (operations 208) permitting calls or other invocations of the driver load functions to be intercepted and the associated driver object code evaluated for indications of a rootkit, i.e., malicious code. Additionally, one or more new device detection functions are hooked in the hardware abstraction layer of the computer system (operation 210) permitting calls or other indications of a new device detection to be intercepted and used to set a new device detection flag.

Upon receipt of a call to a new device detection function (operations 212, 214, and 218), the call is stalled (operation 238), a new device detection flag is set (operation 240), and the call is released to the new device detection function (operation 242). Upon receipt of a call to a driver load function (operations 212, 214, and 216), the call is stalled (operation 220), and a determination is made whether the driver object is a loaded driver listed in the loaded driver database (operation 222).

When the driver object matches an entry in the loaded driver database, it is presumed the call is not indicative of a rootkit, and the call is released (operation 230). However, upon a determination that the driver object does not match an entry in the loaded driver database, a determination is made whether a new device is detected on the computer system by checking whether the new device detection flag is set (operation 224).

When the new device detection flag is set, then it is presumed the driver object and thus the call to the load driver function is associated with a new device installation, and the call is not indicative of a rootkit. The new device detection flag is reset (operation 226) and the call is released (operation 230) to the driver load function.

Alternatively, upon a determination that the new device detection flag is not set, it is not presumed the call is associated with a new device installation and the driver object associated with the call is evaluated to determine whether a rootkit is indicated (operation 228). One embodiment of a method for determining whether a rootkit is indicated is further described herein with reference to FIG. 3.

When a rootkit is not indicated, the call is released (operation 230). Alternatively, upon a determination that a rootkit is indicated, protective action is taken (operation 232), such as failing the call. Optionally, a notification is provided to a user of the detection (operation 234).

Referring now to FIG. 1, FIG. 1 is a diagram of a client-server system 100 that includes a rootkit prevention application 106 executing on a host computer system 102, e.g., a first computer system, in accordance with one embodiment of the present invention. Host computer system 102, sometimes called a client or user device, typically includes a central processing unit (CPU) 108, hereinafter processor 108, an input/output (I/O) interface 110, and a memory 112. In one embodiment, memory 112 includes an operating system 104 such as a page based virtual memory system that uses pages, e.g., memory areas.

For example, Windows® NT and Windows® 2000 are 32-bit operating systems widely used on home and business computer systems. Windows® NT and Windows® 2000 provide page-based virtual memory management schemes that permit programs to realize a 4 GB (gigabyte) virtual memory address space. In one embodiment, when processor 108 is running in virtual memory mode, all addresses are presumed virtual addresses and are translated, or mapped, to physical addresses each time processor 108 executes a new instruction to access memory.

Conventionally, the 4 GB virtual memory address space is divided into two parts: a lower 2 GB user address space, also referred to as user mode address space, or ring 3, available for use by a program; and, a high 2 GB system address space, also referred to as kernel address space, or ring 0, reserved for use by the operating system.

To protect the integrity of the operating system code, and other kernel address space code and data structures from errant or malicious programs, and to provide efficient system security (user rights management), Windows® NT and Windows® 2000 separate code executing in the user address space, e.g., user mode, from code executing in the kernel address space, e.g., kernel mode. User mode code typically does not have direct access to kernel mode code and has restricted access to computer system resources and hardware. To utilize kernel mode code functionalities, such as access to disk drives and network connections, user mode programs utilize system calls, sometimes called operating system (OS) function calls, which interface between the user mode and kernel mode functions.

Host computer system 102 may further include standard devices like a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, rootkit prevention application 106 is loaded into host computer system 102 via I/O device 124, such as from a CD, DVD or floppy disk containing rootkit prevention application 106.

Host computer system 102 is coupled to a server system 130 of client-server system 100 by a network 126. Server system 130 typically includes a display device 132, a processor 134, a memory 136, and a network interface 138.

Further, host computer system 102 is also coupled to a computer system 128, such as an attacker computer system, of client-server system 100 by network 126. In one embodiment, computer system 128 is similar to host computer system 102 and, for example, includes a central processing unit, an input output (I/O) interface, and a memory. Computer system 128 may further include standard devices like a keyboard, a mouse, a printer, a display device and an I/O device (s). The various hardware components of computer system 128 are not illustrated to avoid detracting from the principals of the invention.

Network 126 can be any network or network system that is of interest to a user. In various embodiments, network interface 138 and I/O interface 110 include analog modems, digital modems, or a network interface card.

In one embodiment of the invention, rootkit prevention application 106 is typically stored in memory 112 of host computer system 102 and executed on host computer system 102. The particular type, and configuration, of host computer system 102, computer system 128, and server system 130 are not essential to the present invention.

Some attackers install a kernel rootkit by loading the rootkit as a kernel mode driver. For example, an attacker's code can call selected driver load functions in the operating system through an API to load a driver object that includes a rootkit. An example of such an API command in the Windows operating system is the ZwLoadDriver API command.

When legitimate drivers are loaded via the standard operating system functions, such as via the operating system function associated with the ZwLoadDriver API, herein termed the ZwLoadDriver function, the service control manager of the operating system requires registry keys to be installed to support the driver, and the presence of the loaded driver is identified in the driver registry. As changes to driver registries are often monitored by computer security applications, some attackers attempt to avoid registry changes by utilizing other operating system functions that don't result in registry changes when the rootkit is installed as a driver.

One example of such another operating system function is the operating system function associated with the ZwSetSystemInformation API, herein termed the ZwSetSystemInformation function. The ZwSetSystemInformation function permits manipulation of the kernel content. Some attackers call the ZwSetSystemInformation function and include a parameter 38 in the call, which is an information class number associated with a SystemLoadAndCallImage function. The SystemLoadAndCallImage function allows a driver object, that for example includes an attacker's rootkit, to be quickly loaded into the kernel without driver registry changes.

Hooking driver load functions, such as in one embodiment the ZwLoadDriver function and the ZwSetSystemInformation function, allows calls to the driver load functions to be stalled and the driver objects associated with the calls evaluated for indications of a rootkit. Typically legitimate drivers, e.g., driver objects, are often digitally signed, and the code is viewable, i.e., is not hidden, encrypted, multiply compressed, or otherwise obfuscated. Differently, rootkit code attempting to be installed as a driver object will typically not be digitally signed, and is often hidden by multiple data compressions, encrypting, or otherwise, obfuscating the true nature of the code contents.

When a rootkit is indicated in a driver object, the rootkit can be prevented from installing on the host computer system and other protective actions and/or notifications can be taken if so desired. One example of a method for preventing rootkit installations on a host computer system is further described herein with reference to method 200 and FIG. 2.

Figure 2B:
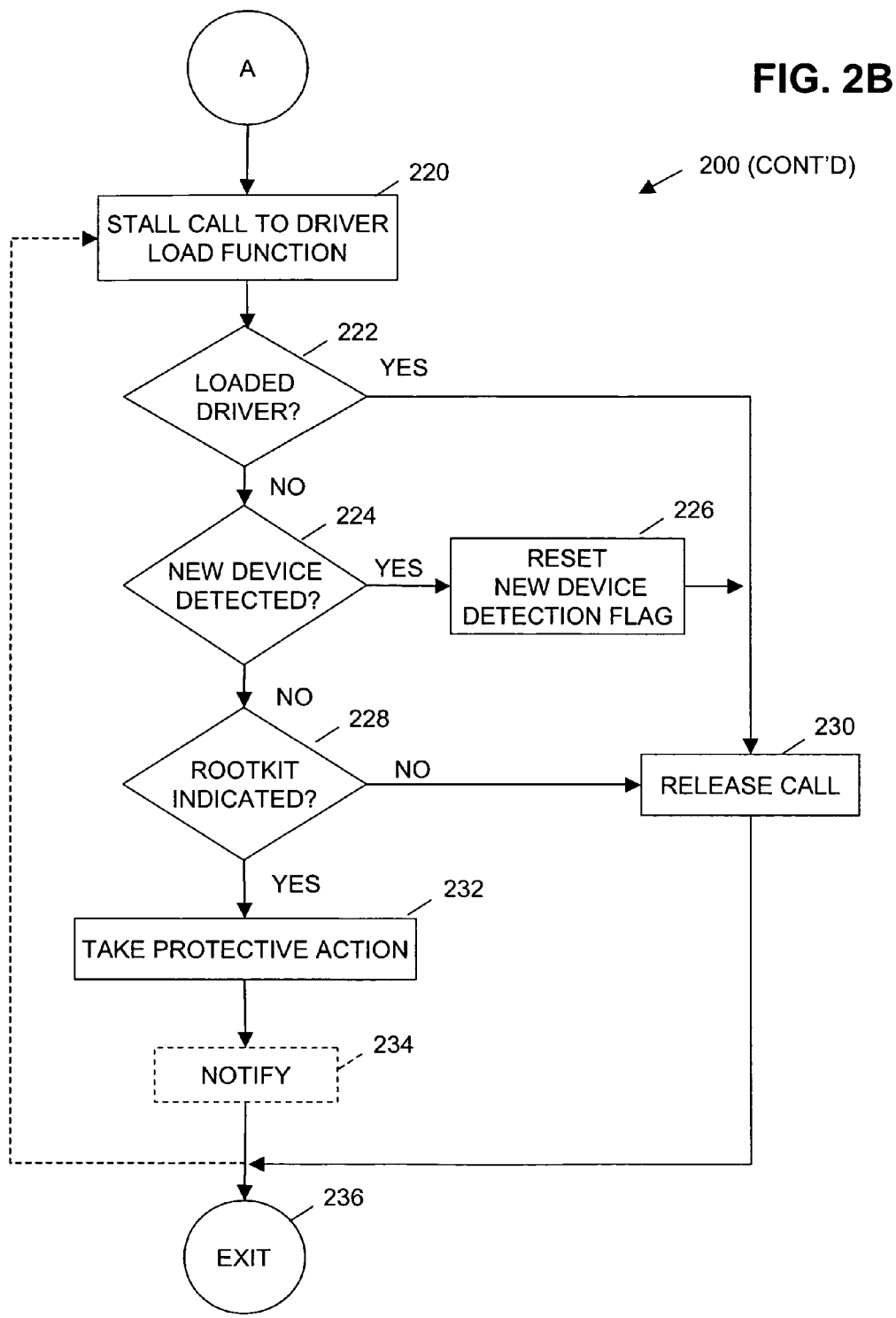
FIG. 2 is a key to FIGS. 2A, 2B, and 2C which illustrate a flow diagram of a method for preventing rootkit installations in accordance with one embodiment of the present invention.
Figure 2C:
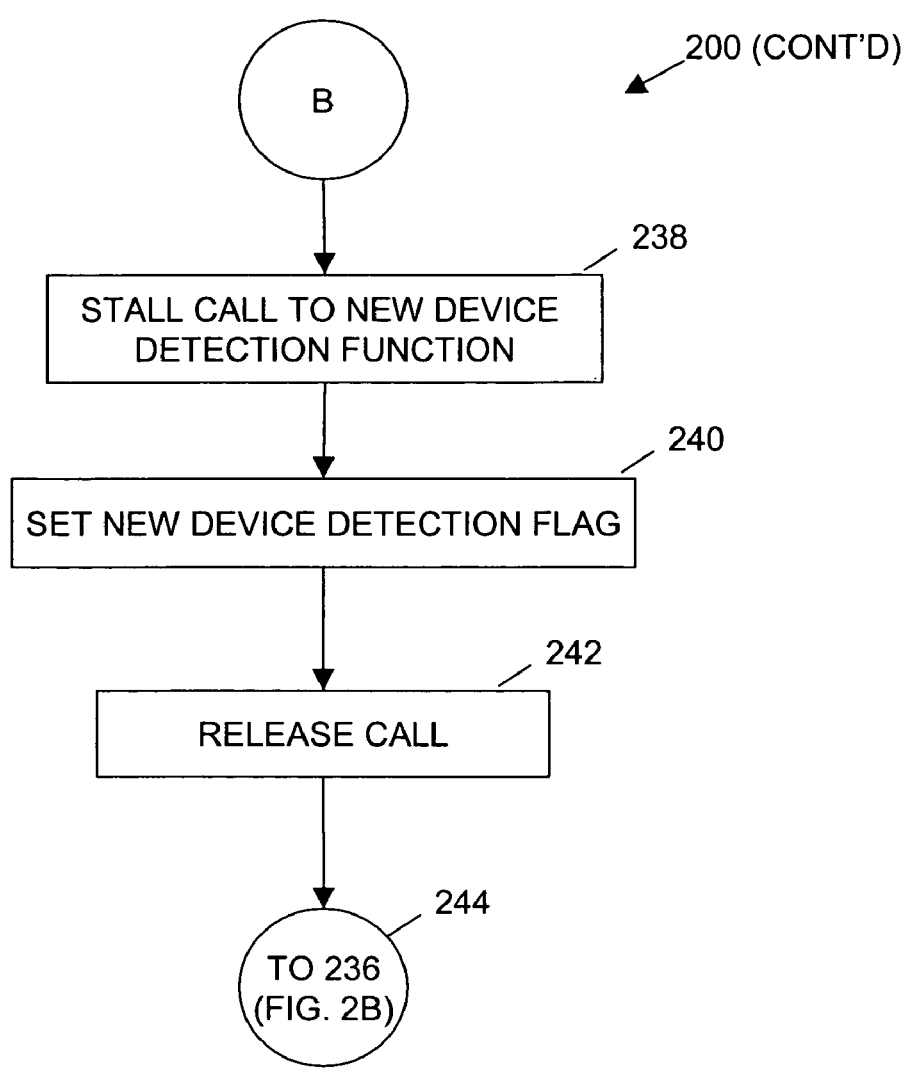

FIG. 2 is a key to FIGS. 2A, 2B, and 2C which illustrate a flow diagram of a method 200 for preventing rootkit installations in accordance with one embodiment of the present invention. Referring now to FIGS. 1 and 2 together, in one embodiment of the invention, execution of rootkit prevention application 106 by processor 108 results in the operations of method 200 as described below.

In the present embodiment, rootkit prevention application 106 is installed on host computer system as a kernel mode driver. In one embodiment, method 200 is entered at an ENTER operation 202, and from ENTER operation 202, processing transitions to an IDENTIFY LOADED DRIVER (S) operation 204.

In IDENTIFY LOADED DRIVER(S) operation 204, drivers currently loaded on host computer system 102 are identified. In one embodiment, currently loaded drivers are identified by querying the operating system. For example, in one embodiment, a Windows operating system can be queried for loaded drivers using the ZwQuerySystemInformation API command. Identification of currently loaded drivers on a computer system is well known to those of skill in the art and is not further described to avoid detracting from the principles of the invention. From IDENTIFY LOADED DRIVER(S) operation 204, processing transitions to a GENERATE LOADED DRIVER DATABASE operation 206.

In GENERATE LOADED DRIVER DATABASE operation 206, a database identifying the loaded driver(s) obtained in operation 204 is generated and stored. In one embodiment, an identifier of each of the loaded drivers, such as a driver name, is stored as a separate loaded driver entry in the database, herein termed the loaded driver database.

In some embodiments, other information can also be stored and associated with a corresponding loaded driver entry, such as the load address of the loaded driver. From GENERATE LOADED DRIVER DATABASE operation 206, processing transitions to a HOOK DRIVER LOAD FUNCTION(S) operation 208.

In HOOK DRIVER LOAD FUNCTION(S) operation 208, one or more selected driver load functions are hooked on host computer system 102. Herein, in one embodiment, a driver load function is an operating system function that loads a driver onto a computer system.

In one embodiment, a driver load function includes the operating system function callable utilizing the ZwLoadDriver API, herein termed the ZwLoadDriver function, and the operating system function callable utilizing the ZwSetSystemInformation API, herein termed the ZwSetSystemInformation function. In particular, in one embodiment, a driver load function includes the operating system function callable utilizing the ZwSetSystemInformation API in which the call includes a parameter 38 identifying a SystemLoadAndCallImage function.

Hooking of driver load functions can be performed utilizing a variety of hooking techniques. For example, in one embodiment, a service descriptor table entry associated with a particular driver load function in a service descriptor table is modified so that a call to the driver load function is redirected to alternate code, such as a hook module of rootkit prevention application 106. In one embodiment, a function pointer in the service descriptor table entry is modified to point to the hook module rather than the driver load function in the operating system.

In one embodiment, the hooking code modifying the service descriptor table entry associated with the ZwSetSystemInformation function specifically hooks calls identifying the SystemLoadAndCallImage function, e.g., calls including parameter 38. Calls not identifying the SystemLoadAndCallImage function, e.g., calls not including parameter 38 are not redirected.

For example, in one embodiment the hooking code modifying the service descriptor table entry associated with the ZwSetSystemInformation function evaluates the call parameters to determine whether the parameter 38, or its equivalent, which identifies the SystemLoadandCallImage function, is present. Calls not identifying the SystemLoadandCallImage function are not redirected and allowed to proceed to the associated operating system function. Differently, calls identifying the SystemLoadandCallImage function are evaluated in accordance with method 200. From HOOK DRIVER LOAD FUNCTION(S) operation 208, processing transitions to a HOOK NEW DEVICE DETECTION FUNCTION(S) IN HARDWARE ABSTRACTION LAYER operation 210.

In HOOK NEW DEVICE DETECTION FUNCTION(S) IN HARDWARE ABSTRACTION LAYER operation 210, new device detection functions are hooked in the hardware abstraction layer (HAL) of the computer system. In particular, in one embodiment, one or more functions in the HAL that detect the connection of new devices to host computer system 102, herein termed new device detection functions, are hooked in the hardware abstraction layer of computer system 102. For example, in one embodiment, one or more new device detection function(s) are hooked in the plug and play interface in the HAL. From HOOK NEW DEVICE DETECTION FUNCTION(S) IN HARDWARE ABSTRACTION LAYER operation 210, processing transitions to a RECEIVE CALL operation 212.

In RECEIVE CALL operation 212, a call to a hooked driver load function or a hooked new device detection function is received by rootkit prevention application 106. From RECEIVE CALL operation 212, processing transitions to an CALL TYPE? check operation 214.

In CALL TYPE? check operation 214, a determination is made whether the call received in operation 212 is a call to a driver load function or a call to a new device detection function. In the present embodiment, CALL TYPE? check operation 214 is included to provide a clearer description of the present invention. It can be understood by those of skill in the art that the functions of operation 214 can be variously implemented, such as by an event handler or other process for routing calls received by rootkit prevention application 106. When the call is a call to a new device detection function, processing transitions from CALL TYPE? check operation 214, at operation 218, to a STALL CALL TO NEW DEVICE DETECTION FUNCTION operation 238 (FIG. 2C).

Referring now to FIG. 2C, in STALL CALL TO NEW DEVICE DETECTION FUNCTION operation 238, a call to a new device detection function is stalled. From STALL CALL TO NEW DEVICE DETECTION FUNCTION operation 238, processing transitions to a SET NEW DEVICE DETECTION FLAG operation 240.

In SET NEW DEVICE DETECTION FLAG operation 240, a new device detection flag is set indicating a new device, such as a new hardware device, is detected on host computer system 102. As explained further herein, it is presumed that a call to a driver load function that occurs when a new device is detected on host computer system 102 is related to the new device detection and thus the call is not subject to further evaluation. In one embodiment, the new device detection flag is an indicator utilized by rootkit prevention application 106 in determining whether a new hardware device has been attached to host computer system 102.

For example, in one embodiment, the new device detection flag is a value initially set to a default setting indicating no new hardware device attachment is detected, such as the value zero (0). When a call to a new device detection function is received, this indicates a new device is detected on host computer system 102, and the new device detection flag is set to another setting to indicate a new device detection, such as to the value one (1). It can be appreciated by those of skill in the art that the above settings are exemplary, and the new device detection flag settings can be differently defined. In one embodiment, the new device detection flag is stored in a memory or can be dynamically allocated. From SET NEW DEVICE DETECTION FLAG operation 240, processing transitions to a RELEASE CALL operation 242.

In RELEASE CALL operation 242, the call to the new device detection function that was stalled in operation 238 is released and allowed to proceed to the associated new device detection function. From RELEASE CALL operation 242, processing transitions to an EXIT operation 236 (FIG. 2B), with processing exiting method 200, or optionally returns to operation 238 on receipt of a next call to a new device detection function.

Referring back again to FIG. 2A and CALL TYPE? check operation 214, alternatively, upon a determination that the call is a call to a driver load function, processing transitions from CALL TYPE? check operation 214, at operation 216, to a STALL CALL TO DRIVER LOAD FUNCTION operation 220 (FIG. 2B).

Referring now to FIG. 2B, in STALL CALL TO DRIVER LOAD FUNCTION operation 220, a call to a driver load function is stalled. In one embodiment, a call to a driver load function, such as a ZwLoadDriver function or a ZwSetSystemInformation function having a parameter of 38, is stalled and prevented from continuing to the associated driver load function in the operating system. From STALL CALL TO DRIVER LOAD FUNCTION operation 220, processing transitions to a LOADED DRIVER? check operation 222.

In LOADED DRIVER? check operation 222, the name or other identifier of the driver object associated with the call to the driver load function is compared to the loaded driver entries in the loaded driver database generated in operation 206 (FIG. 2A). In the present embodiment, it is presumed that any drivers already present on host computer system 102 do not contain rootkits and calls to those loaded drivers are not subject to further evaluation by method 200. Whereas calls to driver load functions having driver objects that are not identified in the loaded driver database are subject to further evaluation.

In one embodiment, when a name or other identifier of a driver object associated with a call to a driver load function matches a loaded driver entry in the loaded driver database ("YES"), the driver object, and thus the call, is presumed not to be indicative of a rootkit. From LOADED DRIVER? check operation 222, processing transitions to a RELEASE CALL operation 230.

In RELEASE CALL operation 230, the call to the driver load function that was stalled in operation 220 is released and allowed to proceed to the associated driver load function in the operating system. From RELEASE CALL operation 230, processing transitions to EXIT operation 236, with processing exiting method 200, or optionally returning to operation 220 on receipt of a next call to a driver load function.

Referring again to LOADED DRIVER? check operation 222, alternatively, when a name or other identifier of a driver object associated with a call to a driver load function does not match a loaded driver entry in the loaded driver database ("NO"), the driver object, and thus the call, is subject to further evaluation. From LOADED DRIVER? check operation 224, processing transitions to NEW DEVICE DETECTED? check operation 226.

In NEW DEVICE DETECTED? check operation 224, a determination is made whether a new device is detected on the computer system. In the present embodiment, it is presumed that a call to a driver load function that occurs when a new device is detected on host computer system 102 is related to the new device detection and thus the call is not subject to further evaluation. Differently a call to a driver load function that occurs when a new device is not detected on host computer system 102 does not receive the presumption and thus the call is subject to further evaluation.

In one embodiment, the new device detection flag is checked and a determination is made whether a new device is detected based on the flag setting. For example, continuing the earlier example, in one embodiment, upon a determination that the new device detection flag is set to zero (0), a new device is not detected on host computer system 102. Conversely, upon a determination that the new device detection flag is set to one (1), a new device is detected on host computer system 102.

In one embodiment, when the new device detection flag is set to indicate a new device is detected on the computer system ("YES"), it is presumed the call to the driver load function is associated with the new device detection. Thus, the call is presumed related to the new device and not subject to further evaluation. From NEW DEVICE DETECTED? check operation 224, processing transitions to a RESET NEW DEVICE DETECTION FLAG operation 226.

In RESET NEW DEVICE DETECTION FLAG operation 226, the new device detection flag is reset to indicate no new device detected on the computer system, e.g., the new device detection flag is cleared. For example, in one embodiment, the new device detection flag is reset to the default setting, e.g., zero (0). From RESET NEW DEVICE DETECTION FLAG operation 226, processing transitions to RELEASE CALL operation 230 as earlier described.

Referring again to NEW DEVICE DETECTED? check operation 224, alternatively, when the new device detection flag is not set to indicate a new device is detected on the computer system ("NO"), it is not presumed that the call is associated with a new device and the call is subject to further evaluation. From NEW DEVICE DETECTED? check operation 224, processing transitions to a ROOTKIT INDICATED? check operation 228.

In ROOTKIT INDICATED? check operation 228, the driver object associated with the call to the driver load function is evaluated to determine whether it is indicative of a rootkit. As earlier described, rootkits typically are not digitally signed, and the contents are sometimes encrypted, compressed multiple times, packed, wrapped, hidden or otherwise obfuscated to avoid detection. One method for determining whether a rootkit is indicated is further described herein with reference to FIG. 3 and method 300.

When a rootkit is not indicated ("NO"), the driver object and thus the associated call to the driver load function is presumed not to be indicative of a rootkit. From ROOTKIT INDICATED? check operation 228, processing transitions to RELEASE CALL operation 230 as earlier described.

Referring again to ROOTKIT INDICATED? check operation 228, alternatively, when a rootkit is indicated ("YES"), the driver object, and thus the associated call to the driver load function, is presumed to be indicative of a rootkit. From ROOTKIT INDICATED? check operation 228, processing transitions to a TAKE PROTECTIVE ACTION operation 232.

In TAKE PROTECTIVE ACTION operation 232, protective action is taken to prevent the rootkit, i.e., the driver object, from installing or otherwise causing damage to, or exploiting, host computer system 102. For example, in one embodiment, the call to the driver load function is failed, e.g., terminated, and a call failure is returned to the calling code.

Failing the call to the driver load function, prevents the associated driver object, i.e., the rootkit, from loading on host computer system 102. By preventing the rootkit installation, remote undetected access to host computer system 102 is denied, thus preventing unauthorized access by malicious attackers or malware. In one embodiment, the user is prompted for input prior to taking protective action, e.g., the user is asked for permission to take protective action. From TAKE PROTECTIVE ACTION operation 232, processing optionally transitions to a NOTIFY operation 234.

In optional NOTIFY operation 234, the user of host computer system 102 in FIG. 1, and/or a system administrator, are notified that protective action has been taken on host computer system 102, e.g., that a call has been terminated. The user can also be notified that a rootkit installation is indicated.

The user and/or administrator can be notified using any one of a number of techniques, e.g., by using a pop up window, by generating an e-mail, by writing to a file and/or otherwise by logging the event. Further, a notification can be provided to a security center. From optional NOTIFY operation 234, processing transitions to EXIT operation 236, as earlier described or optionally returns to operation 220 on receipt of a next call to a driver load function.

The above embodiment of the invention prevents rootkit installations in real time. Thus, the rootkit applications are prevented from manipulating kernel structures and from providing false system information to integrity related programs, such as antivirus programs and integrity checkers.

Figure 3:
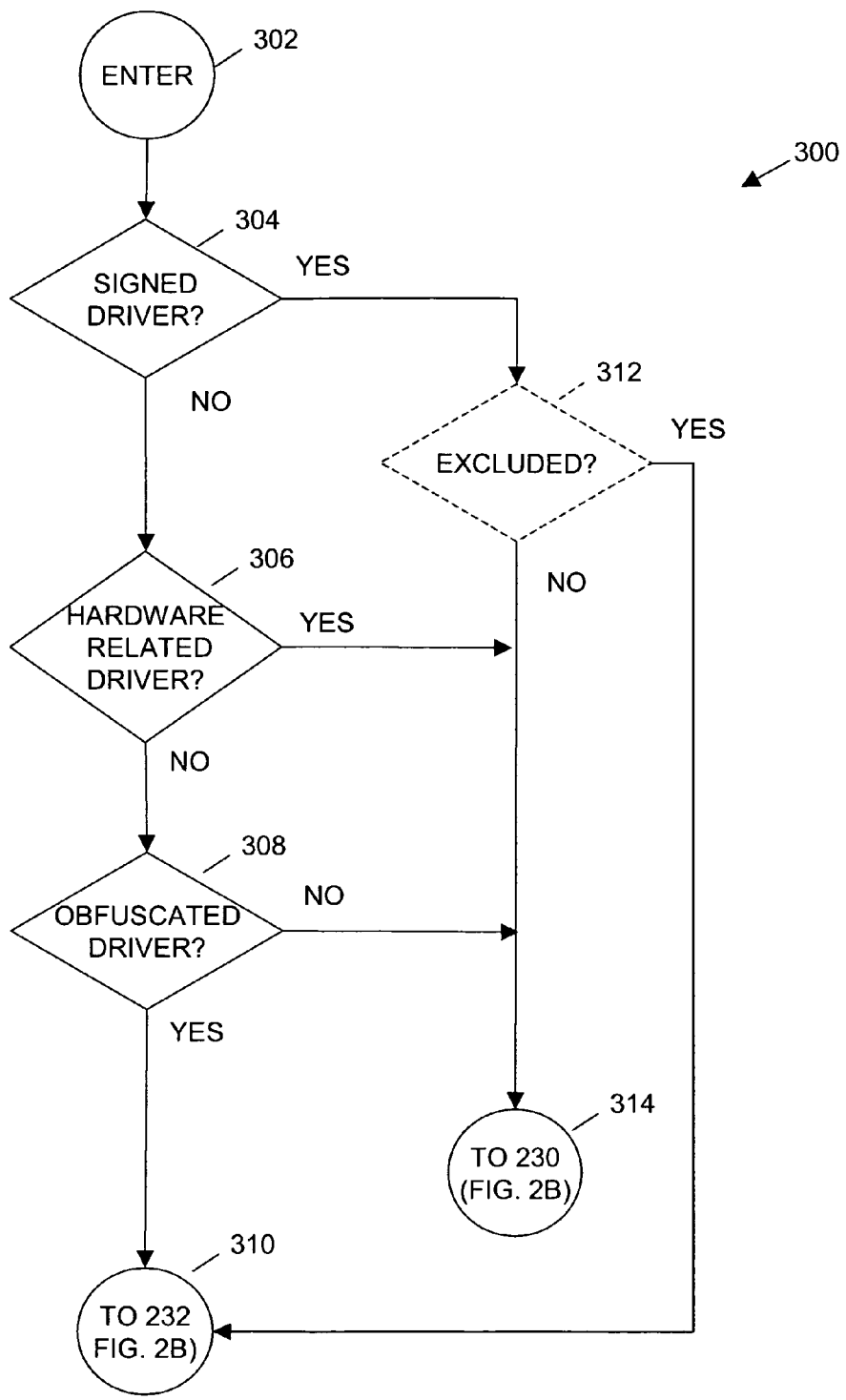
FIG. 3 illustrates a flow diagram of a method for determining whether a rootkit is indicated in a call to a driver load function in accordance with one embodiment of the present invention.

As earlier described, rootkits typically are not digitally signed, and the contents are sometimes encrypted, compressed multiple times, packed, wrapped, hidden or otherwise obfuscated to avoid detection. FIG. 3 illustrates a method 300 for determining whether a rootkit is indicated in a call to a driver load function in accordance with one embodiment of the present invention. Referring now to FIGS. 2 and 3 together, in one embodiment, execution of hooking application 106 by processor 108 results in the operations of method 300 as described below. In one embodiment, method 300 is entered from operation 224 (FIG. 2B), and processing transitions to a SIGNED DRIVER? check operation 304.

In SIGNED DRIVER? check operation 304, the driver object associated with the call to the driver load function, is examined to determine whether it is digitally signed. More particularly, in one embodiment, the driver object is evaluated for the presence of a digital signature. Recognition of a digital signature associated with a driver object is well known to those of skill in the art and is not further described to avoid detracting from the principles of the invention.

When the driver object has a digital signature ("YES"), the driver object is presumed not to be indicative of a rootkit. From SIGNED DRIVER? check operation 304, processing optionally transitions to an EXCLUDED? check operation 312, or directly to RELEASE CALL operation 230 (FIG. 2B) as earlier described, if optional EXCLUDED? check operation 312 is not performed.

In optional EXCLUDED? check operation 312, a determination is made whether the digital signature is an excluded digital signature. More particularly, in one embodiment, a determination is made whether the digital signature initially presumed valid, is not valid, is expired, or otherwise indicative of a rootkit.

In one embodiment, the digital signature is compared to entries in an exclusion database maintained by or accessible by rootkit prevention application 106. In one embodiment, the exclusion database includes digital signatures that are invalid, expired or are otherwise indicative of a rootkit.

When the digital signature of the driver object matches one of the entries in the exclusion database ("YES"), the digital signature that was initially presumed not to be indicative of a rootkit in operation 304, is now excluded from that determination and presumed to be indicative of a rootkit. From optional EXCLUDED? check operation 312, processing transitions to TAKE PROTECTIVE ACTION operation 232 (FIG. 2B) as earlier described.

Alternatively, when the digital signature of the driver object does not match one of the entries in the exclusion database ("NO"), the digital signature is presumed not indicative of a rootkit. From optional EXCLUDED? check operation 312, processing transitions to RELEASE CALL operation 230 (FIG. 2B) with the call to the driver load function being released.

Referring again to SIGNED DRIVER? check operation 304, alternatively, when the driver object is not signed, the call is subject to further evaluation. From SIGNED DRIVER? check operation 304, processing transitions to a HARDWARE RELATED DRIVER? check operation 306.

In HARDWARE RELATED DRIVER? check operation 306, the driver object is examined to determine whether the driver object appears to be a hardware related driver. In particular, in one embodiment, the import table associated with the driver object, herein termed the driver import table, is evaluated to determine whether the driver import table utilizes application program interfaces (APIs) known to be associated with hardware devices. Locating a driver import table associated with a driver object is well known to those of skill in the art and not further described herein to avoid detracting from the principles of the invention.

In one embodiment, each API in the driver import table is compared to hardware API entries in a known hardware API database maintained by or otherwise accessible by rootkit prevention application 106. In one embodiment, when at least one API in the driver import table matches a hardware related API entry in the hardware related API database, the driver object is presumed to be a hardware related driver ("YES") and not indicative of a rootkit. Upon this determination ("YES"), from HARDWARE RELATED DRIVER? check operation 306, processing transitions to RELEASE CALL operation 230 (FIG. 2B) as earlier described.

Referring again to HARDWARE RELATED DRIVER? check operation 306, alternatively, when at least one API in the driver import table does not match one or more hardware API entries in the hardware related API database ("NO"), the driver object presumed not to be a hardware related driver and is presumed indicative of a rootkit. Upon this determination ("NO"), processing transitions from HARDWARE RELATED DRIVER? check operation 306 to an OBFUSCATED DRIVER? check operation 308.

In OBFUSCATED DRIVER? check operation 308, a determination is made whether the driver object contents are obfuscated, i.e., hidden or otherwise difficult to examine. In one embodiment, the driver object is evaluated to determine whether the driver object and/or the driver object contents have been packed, wrapped, encrypted, multiply compressed, or otherwise hidden. Packing, wrapping, encrypting, and multiple compression are obfuscation techniques well known to those of skill in art and are not further described herein to avoid detracting from the principles of the invention.

In one embodiment, upon a determination that the driver object and/or the driver object contents are not obfuscated ("NO"), the driver object and thus the call is determined not to be indicative of a rootkit. Upon this determination ("NO"), from OBFUSCATED DRIVER? check operation 308, processing transitions to RELEASE CALL operation 230 (FIG. 2B) with the call to the driver load function being released as earlier described.

Alternatively, upon a determination that the driver object and/or driver object contents are obfuscated ("YES"), the driver object and thus the call is determined to be indicative of a rootkit. Upon this determination ("YES"), from OBFUSCATED DRIVER? check operation 308, processing transitions to TAKE PROTECTIVE ACTION operation 232 (FIG. 2B) as earlier described.

The above described embodiments of the invention prevented installations of rootkits on a computer system. In other embodiments, rootkit prevention application 106 also includes methods for detecting rootkits on a computer system by periodically checking sensitive structures of the computer system for indications of a rootkit as further described herein with reference to FIGS. 4, 6, and 7 and by detecting rootkits in calls which add entries to sensitive structures of the computer system as further described with reference to FIG. 5.

In some embodiments, rootkit prevention application 106 can create a call thread that runs periodically, such as for example every 5 or 10 seconds, and the operating system will call rootkit prevention application 106, or selected methods of rootkit prevention application 106, and the sensitive structures can be evaluated for changes indicating a rootkit as further described herein.

When process threads, also termed herein simply threads, are generated on a computer system running a Window operating system, such as Windows NT, each thread includes a service descriptor table (SDT) field having a service descriptor table address pointer that identifies a service descriptor table utilized by the thread. Some rootkits modify the service descriptor table address pointer in selected process threads to point to a copy of the original service descriptor table.

This technique allows a rootkit developer to be selective about what processes are compromised. Rather than making changes to the original service descriptor table and potentially making the entire computer system unstable, the rootkit developer can target specific processes by redirecting specific threads to a copy of the original service descriptor table that the rootkit can then alter.

When there is an antivirus (AV) application monitoring the original service descriptor table for changes, the rootkit developer can in effect disable the antivirus application. For example, if an antivirus application is monitoring the original service descriptor table, and the service descriptor table address pointer of the AV application is not modified by the rootkit, the AV application continues to monitor the original system service descriptor table. The rootkit modifies the service descriptor table address pointers of selected threads to point to a new service descriptor table, which the rootkit has modified. Consequently, processes running on the computer system with modified service descriptor table address pointers will utilize the new service descriptor table and interact with the operating system in accordance with alterations made by the rootkit. The original service descriptor table will appear seemingly unaltered to the AV application monitoring it. In this way the actions of the rootkit are concealed from checks made by the AV application and the operating system on the original service descriptor table.

Figure 4:
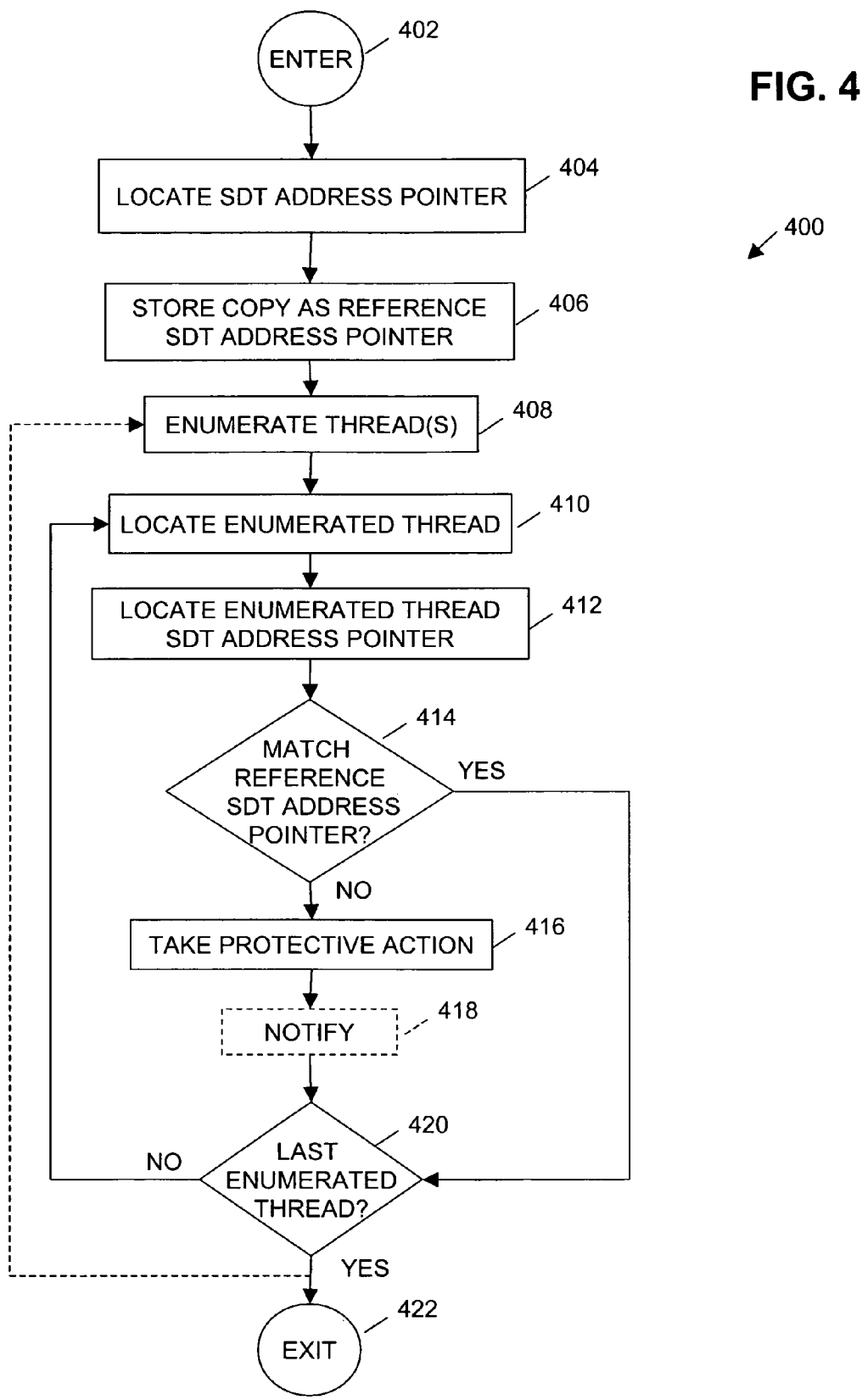
FIG. 4 illustrates a flow diagram of a method for detecting a rootkit in accordance with one embodiment of the present invention.

FIG. 4 illustrates a flow diagram of a method 400 for detecting a rootkit in accordance with one embodiment of the present invention. Generally viewed, embodiments in accordance with method 400 locate a presumed unmodified service descriptor table address pointer value to be used as a reference and store a copy of that value for later reference. Process threads currently running on the computer system are periodically enumerated and the service descriptor table address pointer of each process thread is compared to the stored reference. When the service descriptor table address pointer and the reference do not match, it is presumed a change has been made to the process thread service descriptor table address pointer and a rootkit is indicated.

Referring now to FIGS. 1 and 4 together, in one embodiment of the invention, execution of rootkit prevention application 106 by processor 108 results in the operations of method 400 as described below. In one embodiment, method 400 is entered at an ENTER operation 402, and from ENTER operation 402, processing transitions to a LOCATE SDT ADDRESS POINTER operation 404.

In LOCATE SDT ADDRESS POINTER operation 404, a service descriptor table (SDT) address pointer, sometimes termed a KSDT address pointer, which is to be used as a reference SDT address pointer is located. Herein a SDT address pointer that is to be used as a reference SDT address pointer, is an address pointer presumed to point to an original service descriptor table that has not been modified by a rootkit.

In one embodiment, the SDT address pointer is the SDT address pointer utilized by process threads of rootkit prevention application 106. In one embodiment, the SDT address pointer utilized by rootkit prevention application 106 is located in a KSDT address pointer field of a Kthread block associated with rootkit prevention application 106 in the kernel of the operating system. In other embodiments, the SDT address pointer can be differently obtained. From LOCATE SDT ADDRESS POINTER operation 404, processing transitions to a STORE COPY AS REFERENCE SDT ADDRESS POINTER operation 406.

In STORE COPY AS REFERENCE SDT ADDRESS POINTER operation 406, the SDT address pointer located in operation 404 is copied and stored off to a memory location. Herein the stored off copy of the SDT address pointer is termed the reference SDT address pointer.

In the present embodiment, the reference SDT address pointer is stored at a location by rootkit prevention application 106 in an attempt to prevent modification by malicious code. In one embodiment the memory location is dynamically allocated. In one embodiment, the location of and/or the reference SDT address pointer is encrypted. From STORE COPY AS REFERENCE SDT ADDRESS POINTER operation 406, processing transitions to an ENUMERATE THREAD(S) operation 408.

In ENUMERATE THREAD(S) operation 408, program thread(s) currently running, e.g., currently executing, on host computer system 102 are enumerated. In one embodiment, currently running threads are enumerated, for example, using a system call such as Kthread or ZwQuerySystemInformation, which generates a listing of threads currently running in the operating system, herein termed the listing of enumerated threads.

In one embodiment, the listing of enumerated threads identifies each enumerated thread and includes information for locating the enumerated thread and its associated SDT address pointer. Enumeration of running threads in a computer system is well known to those of skill in the art and is not further described to avoid detracting from the principles of the invention. From ENUMERATE THREAD(S) operation 408, processing transitions to a LOCATE ENUMERATED THREAD operation 410.

In LOCATE ENUMERATED THREAD operation 410, the location of an enumerated thread is obtained from the listing of enumerated threads generated in operation 408. From LOCATE ENUMERATED THREAD operation 410, processing transitions to a LOCATE ENUMERATED THREAD SDT ADDRESS POINTER operation 412.

In LOCATE ENUMERATED THREAD SDT ADDRESS POINTER operation 412, the SDT address pointer of the enumerated thread located in operation 410, e.g., a current thread, is located. In one embodiment, the SDT address pointer of the enumerated thread is located in a SDT address pointer field of the associated thread structure maintained in the kernel of the operating system, such as in a field of the Kblock structure associated with the enumerated thread. From LOCATE SDT ADDRESS POINTER OF ENUMERATED THREAD operation 412, processing transitions to a MATCH REFERENCE SDT ADDRESS POINTER? check operation 414.

In MATCH REFERENCE SDT ADDRESS POINTER? check operation 414, the SDT address pointer of the enumerated thread located in operation 410, i.e., the current thread, is compared to the reference SDT address pointer. When the SDT address pointer of the enumerated thread matches the reference SDT address pointer ("YES"), the SDT address pointer of the enumerated thread is presumed unmodified by a rootkit, i.e., a rootkit is not indicated. From MATCH REFERENCE SDT ADDRESS POINTER? check operation 414 processing transitions to a LAST ENUMERATED THREAD? check operation 420.

In LAST ENUMERATED THREAD? check operation 420, a determination is made whether the current enumerated thread, i.e., the enumerated thread obtained in operation 410, is the last enumerated thread in the listing of enumerated threads. When the current enumerated thread is not the last enumerated thread, processing returns to operation 410 with a next enumerated thread in the listing of enumerated threads being located.

Referring again to MATCH REFERENCE SDT ADDRESS POINTER? check operation 414, alternatively, when the SDT address pointer of the enumerated thread does not match the reference SDT address pointer ("NO"), the SDT address pointer of the enumerated thread is presumed to be modified by a rootkit, i.e., indicative of a rootkit. From MATCH REFERENCE SDT ADDRESS POINTER? check operation 414 processing transitions to a TAKE PROTECTIVE ACTION operation 416.

In TAKE PROTECTIVE ACTION operation 416, protective action is taken to prevent damage to or exploitation of host computer system 102. For example, in one embodiment, the enumerated thread SDT address pointer is overwritten with a copy of the reference SDT address pointer. In some embodiments, a copy of the enumerated thread SDT address pointer is stored off to a text file for later analysis. In one embodiment, the user is prompted for input prior to taking protective action, e.g., the user is asked for permission to take protective action. From TAKE PROTECTIVE ACTION operation 416, processing optionally transitions to a NOTIFY operation 418.

In optional NOTIFY operation 418, the user of host computer system 102 in FIG. 1, and/or a system administrator, are notified that protective action has been taken on host computer system 102, e.g., that a call, a parent application and/or a call function have been terminated. The user can also be notified that a rootkit installation is indicated.

The user and/or administrator can be notified using any one of a number of techniques, e.g., by using a pop up window, by generating an e-mail, by writing to a file and/or otherwise by logging the event. Further, a notification can be provided to a security center. From optional NOTIFY operation 418, processing transitions to LAST ENUMERATED THREAD? check operation 420 as earlier described.

In another embodiment of the invention, rootkit prevention application 106 can detect rootkits on a computer system by evaluating calls that add entries to a local descriptor table (LDT) and/or by periodically checking a LDT of a computer system for indications of a rootkit. A local descriptor table (LDT) is a per process private data structure that can allow a communication channel from user mode to kernel mode. Generally, an LDT includes one or more LDT entries that map small regions of memory within user mode and kernel mode. Using an LDT it is possible to transfer control between user mode and kernel mode and to send data back and forth.

Conventionally, in an IA-32 architecture, each LDT entry includes a 32 bit value data structure termed a segment descriptor. The segment descriptor contains a plurality of fields used to provide the processor with information on the size and location of a segment, as well as access control and status information.

In particular, the segment descriptor contains an S field, also termed a descriptor type field, at bit location 12 that contains a value termed the termed the S flag, or descriptor type flag. The S flag specifies whether the segment descriptor is for a system segment indicating a kernel mode, or an application segment, i.e., code or data segment, indicating user mode.

An S flag set to zero (0) indicates a system segment, i.e., kernel mode. An S flag set to one (1) indicates an application segment, i.e., a code or data segment. Thus, when an S flag of an LDT entry is set to zero (0), the LDT entry indicates the associated segment code is for execution in kernel mode.

The segment descriptor also contains a DPL field, also termed a descriptor privilege level field, at bit locations 13 and 14 that contain a 2 bit value termed the DPL, or descriptor privilege level. The DPL specifies the privilege level of the segment and is used to control access to the segment. The value of the DPL can range from 0 to 3, with 0 being the most privileged level, i.e., a kernel mode privilege level. A DPL value of 3, indicated by bits 13 and 14 each being set to one (1), indicates a user mode privilege level.

Some rootkits modify the LDT to transfer control from user mode to kernel mode, for example, by setting the DPL to indicate an access privilege level of three (3), e.g., user mode privilege, when the S flag is set to zero (0), indicating kernel mode execution. For example, a rootkit could indicate a level three (3) access privilege by setting the value at bit location 13 to one (1) and the value at bit location 14 to one (1). Consequently, an attacker can use the LDT to make a piece of user mode code appear as though it belongs to the kernel mode and which can then be run with kernel mode privileges, even though the code exists in user mode, thus presenting a serious security risk.

In Windows NT operating system the NTAddLDTEntry API is available to user mode programs to effect changes to the LDT. This API can be intercepted within kernel mode.

In accordance with one embodiment, a call to an operating system function that adds an LDT entry to an LDT, such as a function associated with an NTAddLDTEntry API, is stalled and a determination is made whether the associated LDT entry, i.e., the LDT entry to be added, is indicative of a rootkit. In particular, in one embodiment, a determination is made whether the S flag of the associated LDT entry is set for kernel mode, i.e., zero (0), and the DPL is set for user mode, i.e., three (3), indicating that a user mode application can access kernel mode privileged code. One example of a method for detecting a rootkit in this way is further described herein with reference to method 500 and FIG. 5.

Figure 5:
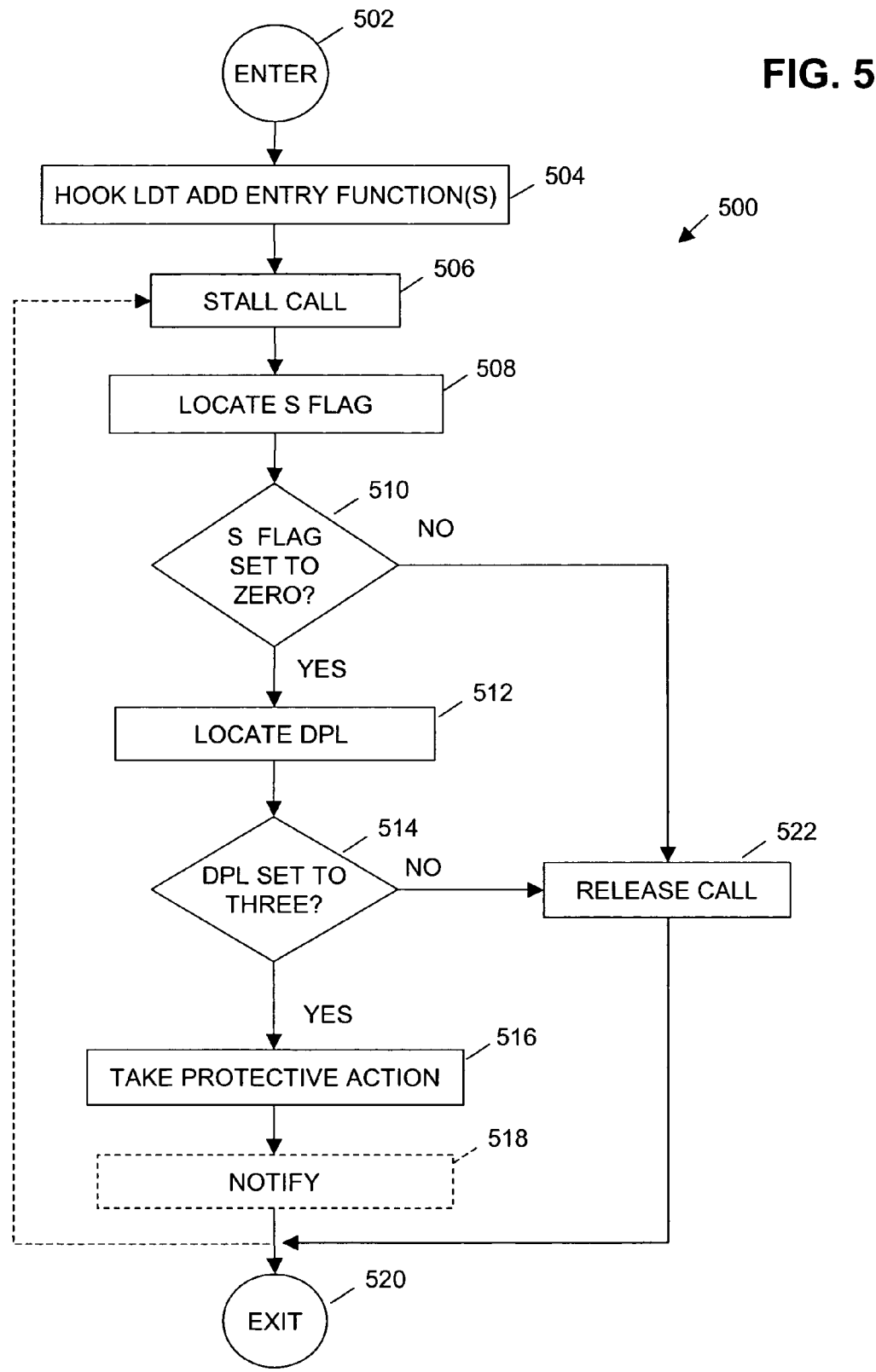
FIG. 5 illustrates a flow diagram of a method for detecting a rootkit in accordance with another embodiment of the present invention.

FIG. 5 illustrates a flow diagram of a method 500 for detecting a rootkit in accordance with another embodiment of the present invention. Referring now to FIGS. 1 and 5 together, in one embodiment, execution of rootkit prevention application 106 by processor 108 results in the operations of method 500 as described below. In one embodiment, method 500 is entered at an ENTER operation 502, and from ENTER operation 502, processing transitions to a HOOK LDT ADD ENTRY FUNCTION(S) operation 504.

In HOOK LDT ADD ENTRY FUNCTION(S) operation 504, an operating system function(s) that adds LDT entries to an LDT, herein termed an LDT add entry function(s), is hooked. In particular in one embodiment, an operating system function associated with the NTAddLDTEntry API, or its equivalent, is hooked on host computer system 102. In one embodiment, the function associated with the NTAddLDTEntry API, herein termed the NTAddLDTEntry function, is hooked, such as in a service descriptor table of host computer system 102. As earlier described, hooking of operating system functions can be performed utilizing a variety of hooking techniques.

For example, in one embodiment, a service descriptor table entry associated with the NTAddLDTEntry API function in a service descriptor table is modified so that a call to the NTAddLDTEntry function is redirected to alternate code, such as hook module of rootkit prevention application 106. In one embodiment, a function pointer in the service descriptor table entry is modified to point to a hook module of rootkit prevention application 106, rather than the NTAddLDTEntry function in the operating system. From HOOK LDT ADD ENTRY FUNCTION(S) operation 504, processing transitions to a STALL CALL operation 506.

In STALL CALL operation 506, the call to the NTAddLDTEntry function is stalled and prevented from continuing to the associated function in the operating system. From STALL CALL operation 506, processing transitions to a LOCATE S FLAG operation 508.

In LOCATE S FLAG operation 508, the S flag of the LDT entry associated with the call is located. For example, in one embodiment, the S field of the LDT entry associated with the call is located at bit location 12 and the S flag is located within the S field. From LOCATE S FLAG operation 508, processing transitions to an S FLAG SET TO ZERO? check operation 510.

In S FLAG SET TO ZERO? check operation 510, the S flag located in operation 508 is evaluated to determine whether it is set to zero (0), or otherwise indicates a kernel mode execution privilege. When the S flag is not set to zero (0) ("NO"), the associated code is not for execution in kernel mode, and thus is presumed not to need further evaluation for rootkit indications. From S FLAG SET TO ZERO? check operation 510 processing transitions to RELEASE CALL operation 522.

In RELEASE CALL operation 522, the call that was stalled in operation 506 is released. More particularly, the call to the NTAddLDTEntry function is released and allowed to proceed to the NTAddLDTEntry function in the operating system. From RELEASE CALL operation 522, processing transitions to an EXIT operation 520 with processing exiting method 500, or optionally returning to operation 506 upon receipt of a next call.

Referring again to S FLAG SET TO ZERO? check operation 510, alternatively, when the S flag is set to zero (0) ("YES"), or otherwise indicates a kernel mode execution privilege, the LDT entry is further evaluated for indications of a rootkit. From S FLAG SET TO ZERO? check operation 510 processing transitions to a LOCATE DPL operation 512.

In LOCATE DPL operation 512, the DPL of the LDT entry associated with the call is located. For example, in one embodiment, the DPL field of the LDT entry associated with the call is located at bit locations 13 and 14, and the DPL is located within the DPL field. From LOCATE DPL operation 512, processing transitions to a DPL SET TO THREE? check operation 514.

In DPL SET TO THREE? check operation 514, the DPL located in operation 512 is evaluated to determine whether it is set to three (3), or otherwise indicates a user mode access privilege level. For example, in one embodiment, the values at bit locations 13 and 14 are evaluated to determine whether they are set to one (1) and one (1), respectively, indicating an access privilege of 3. When the DPL is not set to three (3) ("NO"), or otherwise does not indicate a user mode access privilege, processing transitions from DPL SET TO THREE? check operation 514, to RELEASE CALL operation 522 as earlier described.

Referring again to DPL SET TO THREE? check operation 514, alternatively, when the DPL is set to three (3) ("YES"), or otherwise indicates a user mode access privilege, the LDT entry and thus the call is indicative of a rootkit. From DPL SET TO THREE? check operation 514, processing transitions to a TAKE PROTECTIVE ACTION operation 516.

In TAKE PROTECTIVE ACTION operation 516, protective action is taken to prevent the call from proceeding to the NTAddLDTEntry function in the operating system. For example, in one embodiment, the call to the NTAddLDTEntry function is failed, e.g., terminated, and a call failure is returned to the calling code.

Failing the call to the NTAddLDTEntry function prevents the associated LDT entry, i.e., the rootkit, from being added to the LDT of host computer system 102. In one embodiment, the user is prompted for input prior to taking protective action, e.g., the user is asked for permission to take protective action. From TAKE PROTECTIVE ACTION operation 516, processing optionally transitions to a NOTIFY operation 518, or, if optional NOTIFY operation 518 is not performed, directly to EXIT operation 520 as earlier described with processing exiting method 500.

In optional NOTIFY operation 518, a user of host computer system 102 and/or a system administrator are notified that protective action has been taken on host computer system 102. The user and/or system administrator can be notified using any one of a number of techniques, such as by using a pop up window, by writing to a file, and/or otherwise by logging the event. Further, a notification can be provided to a security center. From optional NOTIFY operation 518, processing transitions to EXIT operation 520, as earlier described, or optionally returning to operation 506 on receipt of a next call.

In an alternative embodiment, rather than, or in addition to method 500, an LDT table of host computer system 102 is periodically checked for entries indicative of a rootkit. One embodiment of this alternative embodiment is further described herein with reference to method 600 and FIG. 6.

Figure 6:
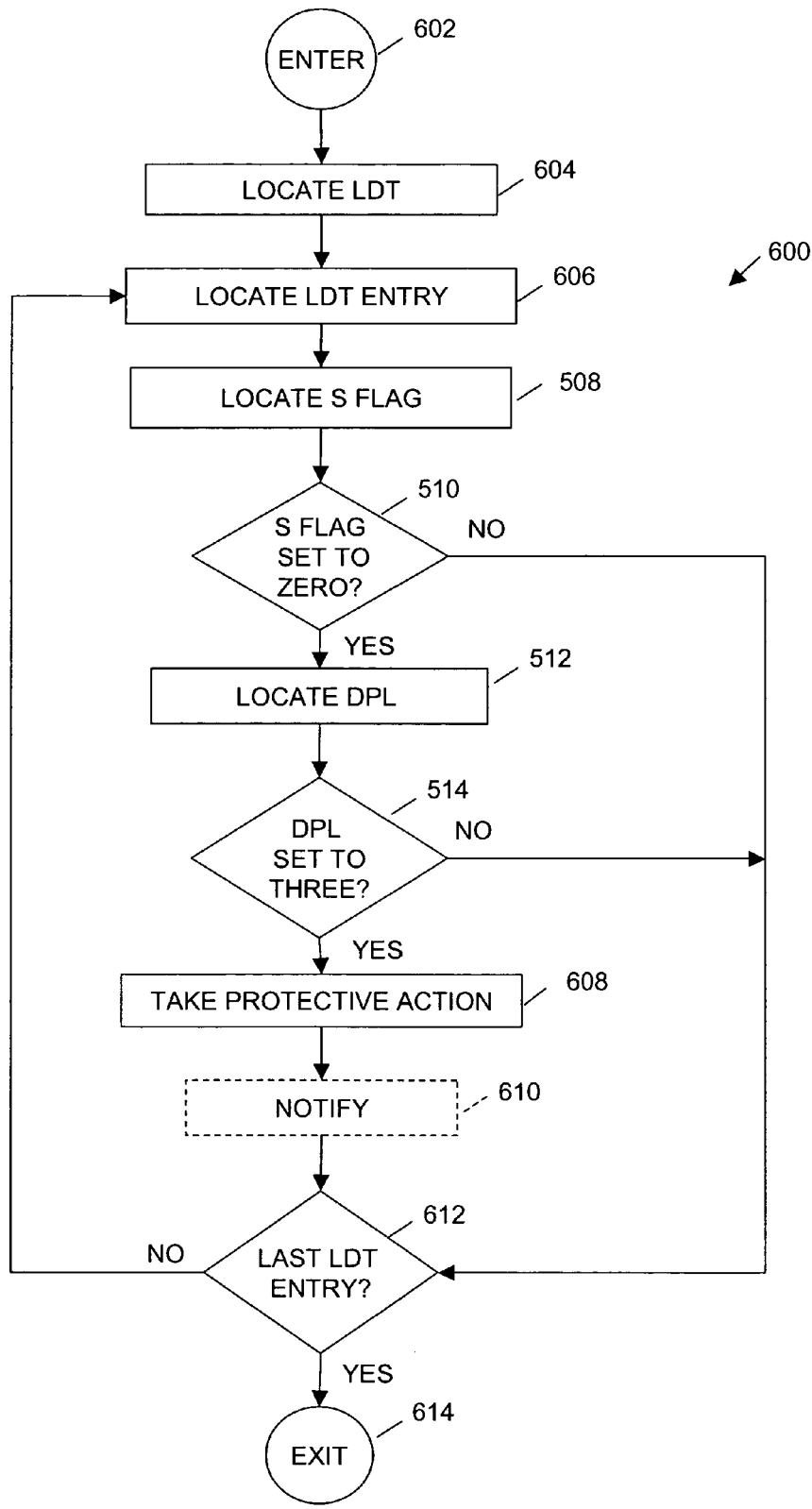
FIG. 6 illustrates a flow diagram of a method for detecting a rootkit in accordance with another embodiment of the present invention.

FIG. 6 illustrates a flow diagram of a method 600 for detecting a rootkit in accordance with another embodiment of the present invention. Referring now to FIGS. 1 and 6 together, in one embodiment of the invention, execution of rootkit prevention application 106 by processor 108 results in the operations of method 600 as described below. In one embodiment, method 600 is entered at an ENTER operation 602, and from ENTER operation 602, processing transitions to a LOCATE LDT operation 604.

In LOCATE LDT operation 604, the local descriptor table (LDT) of host computer system 102 is located. For example, in one embodiment, the LDT is located using the SLDT (Store Local Descriptor Table) instructions. Locating an LDT on a host computer system is well known to those of skill in the art and is not further described herein to avoid detracting from the principles of the invention. From LOCATE LDT operation 604, processing transitions to a LOCATE LDT ENTRY operation 606.

In LOCATE LDT ENTRY operation 606, an LDT entry in the LDT is located, and processing transitions to LOCATE EXECUTION PRIVILEGE FLAG operation 508. In the present embodiment, the descriptions of operations 508 through 512 are generally performed as described with reference to method 500 and FIG. 5 with modifications to make allowance for the performance of the operations with reference to an LDT and LDT entries.

In LOCATE S FLAG operation 508, the S flag of the LDT entry located in operation 606, herein termed the current LDT entry, is located. For example, in one embodiment, the S flag field of the LDT entry is located at bit location 12 and the S flag is located within the field. From LOCATE S FLAG operation 508, processing transitions to S FLAG SET TO ZERO? check operation 510.

In S FLAG SET TO ZERO? check operation 510, the S flag located in operation 508 is evaluated to determine whether it is set to zero (0), or otherwise indicates a kernel mode execution privilege. When the S flag is not set to zero (0) ("NO"), processing transitions from S FLAG SET TO ZERO? check operation 510 to LAST LDT ENTRY check operation 612.

In LAST LDT ENTRY? check operation 612, a determination is made whether the LDT entry located in operation 606, i.e., the current LDT entry, is the last LDT entry in the LDT. When the current LDT is the last LDT entry in the LDT ("YES"), processing transitions from LAST LDT ENTRY? check operation 612 to an EXIT operation 614, with processing exiting method 600.

Alternatively, when the current LDT is not the last LDT entry in the LDT ("NO"), processing transitions from LAST LDT ENTRY? check operation 612 and returns to LOCATE LDT ENTRY operation 606, with a next LDT entry being located in the LDT.

Referring again to S FLAG SET TO ZERO? check operation 510, alternatively, when the S flag is set to zero (0) ("YES"), or otherwise indicates a kernel mode execution privilege, processing transitions from S FLAG SET TO ZERO? check operation 510 to a LOCATE DPL operation 512.

In LOCATE DPL operation 512, the DPL of the LDT entry is located. For example, in one embodiment, the DPL field of the LDT entry is located at bit locations 13 and 14 of the LDT, and the DPL is located within the DPL field. From LOCATE DPL operation 512, processing transitions to a DPL SET TO THREE? check operation 514.

In DPL SET TO THREE? check operation 514, the DPL located in operation 512 is evaluated to determine whether it is set to three (3), or otherwise indicates a user mode access privilege level. When the DPL is not set to three (3) ("NO"), or otherwise does not indicate a user mode access privilege, processing transitions from DPL SET TO THREE? check operation 514, to LAST LDT ENTRY? check operation 612 as earlier described.

Referring again to DPL SET TO THREE? check operation 514, alternatively, when the DPL is set to three (3), or otherwise indicates a user mode access privilege, a rootkit is indicated. From DPL SET TO THREE? check operation 514, processing transitions to a TAKE PROTECTIVE ACTION operation 608.

In TAKE PROTECTIVE ACTION operation 608, protective action is taken. For example, in one embodiment, the LDT entry is copied to a text file for later analysis. In another embodiment, the LDT entry is removed. In one embodiment, the user is prompted for input prior to taking protective action, e.g., the user is asked for permission to take protective action.

From TAKE PROTECTIVE ACTION operation 608, processing optionally transitions to a NOTIFY operation 610, or, if optional NOTIFY operation 610 is not performed, directly to LAST LDT ENTRY? check operation 612 as earlier described.

In optional NOTIFY operation 610, a user of host computer system 102 and/or a system administrator are notified that protective action has been taken on host computer system 102. The user and/or system administrator can be notified using any one of a number of techniques, such as by using a pop up window, by writing to a file, and/or otherwise by logging the event. Further, a notification can be provided to a security center. From optional NOTIFY operation 610, processing transitions to LAST LDT ENTRY? check operation 612 as earlier described.

Similar to modifying service descriptor table address pointers and local descriptor table entries, rootkits can modify entries in service dispatch routine tables utilized by drivers. When a driver is called, each driver has a table of default functions that it supports, for example, open file or print file. This table is herein termed the driver service dispatch routine table.

Each function supported by the driver has a corresponding entry in the driver service dispatch routine table (SDRT). Each entry in the driver service dispatch routine table, herein termed a driver service dispatch routine table (SDRT) entry, includes a routine address pointer that identifies the location of a particular routine in the driver, i.e., in the address space allocated to the driver in memory. Rootkits can modify a routine address pointer in a service dispatch routine table entry so that a call to the associated routine in the driver is redirected to alternate code, such as rootkit code.

Figure 7:
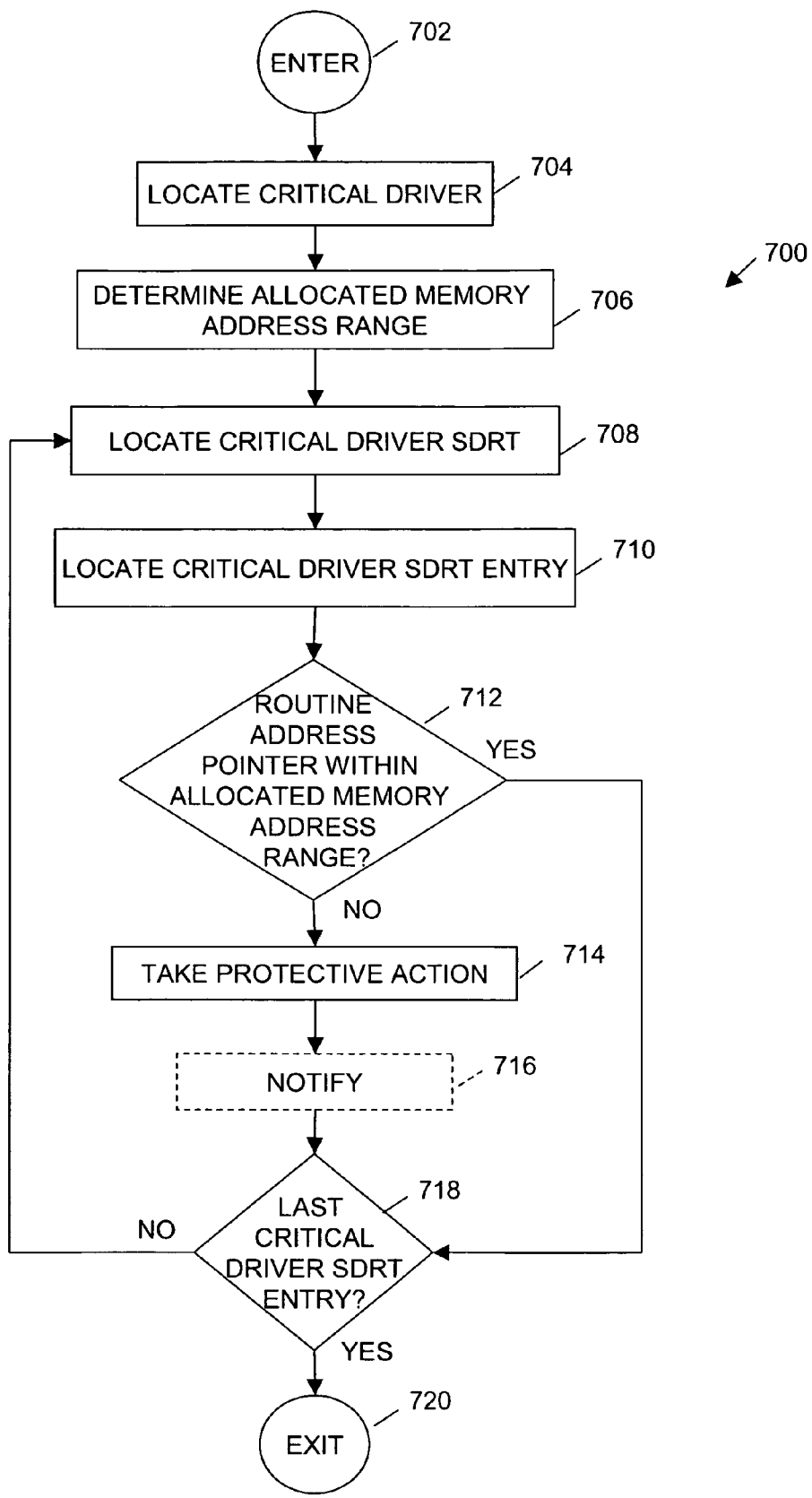
FIG. 7 illustrates a flow diagram of a method for detecting a rootkit in accordance with another embodiment of the present invention.

FIG. 7 illustrates a flow diagram of a method 700 for detecting a rootkit in accordance with another embodiment of the present invention. Referring now to FIGS. 1 and 7 together, in one embodiment of the invention, execution of rootkit prevention application 106 by processor 108 results in the operations of method 700 as described below. In one embodiment, method 700 is entered at an ENTER operation 702, and from ENTER operation 702, processing transitions to a LOCATE CRITICAL DRIVER operation 704.

In LOCATE CRITICAL DRIVER operation 704, a critical driver is located on host computer system 102.

In one embodiment, a critical driver is a driver determined to need protection from rootkit modifications. In particular, in one embodiment, a critical driver is a known computer security related driver, such as an antivirus software driver, determined to need protection from rootkit modifications.

In one embodiment, rootkit prevention application 106 includes a database of critical driver identifiers, herein termed the critical driver database. In one embodiment, the critical driver database includes an entry for each critical driver. In one embodiment, each entry includes a critical driver identifier, such as a critical driver name.

On start up, rootkit prevention application 106 locates a critical driver in the critical driver database and locates the critical driver on host computer system 102, for example, using the ZwQuerySystemInformation API. Locating known drivers on a host computer system is well known to those of skill in the art and not further described herein to avoid detracting from the principles of the invention. From LOCATE CRITICAL DRIVER operation 704 processing transitions to a DETERMINE ALLOCATED MEMORY ADDRESS RANGE operation 706.

In DETERMINE ALLOCATED MEMORY ADDRESS RANGE operation 706, the memory address range allocated to the critical driver located in operation 704, e.g., the current critical driver, is determined, herein termed the allocated memory address range. For example, in one embodiment, the start address of the allocated memory address range is the starting address of the critical driver. In one embodiment, the end address of the allocated memory address range is determined using the size of image value located in the PE file header of the critical driver.

In one embodiment, the size of image field in the PE file header of the critical driver is located. Conventionally, the size of image field is located at an offset of 80 from the start of the PE header. The size of image value located in the size of image field indicates the size of memory allocated to the critical driver. The size of image value is added to the start address of the critical driver and the resulting sum is the end address of the memory address range for the critical driver. From DETERMINE ALLOCATED MEMORY ADDRESS RANGE operation 706, processing transitions to a LOCATE CRITICAL DRIVER SDRT operation 708.

In LOCATE CRITICAL DRIVER SDRT operation 708, the driver service dispatch routine table (SDRT) utilized by the critical driver is located, for example, utilizing the PE file header information associated with the critical driver. Locating a driver service dispatch routine table in a driver using PE file header information is well known to those of skill in the art and not further described herein to avoid detracting from the principles of the invention. From LOCATE CRITICAL DRIVER SDRT operation 708, processing transitions to a LOCATE CRITICAL DRIVER SDRT ENTRY operation 710.

In LOCATE CRITICAL DRIVER SDRT ENTRY operation 710, a critical driver service dispatch routine table (SDRT) entry is located in the critical driver service dispatch routine table located in operation 708. From LOCATE CRITICAL DRIVER SERVICE DISPATCH ROUTINE TABLE ENTRY operation 710, processing transitions to a ROUTINE ADDRESS POINTER WITHIN ALLOCATED MEMORY ADDRESS RANGE? check operation 712.

In ROUTINE ADDRESS POINTER WITHIN ALLOCATED MEMORY ADDRESS RANGE? check operation 712, the critical driver service dispatch routine table entry is evaluated to determine whether a rootkit is indicated. In one embodiment, the critical driver service dispatch routine table entry is evaluated to determine whether the associated routine address pointer points to, i.e., identifies, an address within the allocated memory address range of the critical driver.

In one embodiment, when the routine address pointer identifies a memory location within the start address and the end address of the allocated memory range, the routine address pointer identifies a memory location within the allocated memory address range. Otherwise, the routine address pointer does not identify a memory location within the allocated memory address range.

When the routine address pointer identifies a memory location within the allocated memory address range ("YES"), the critical driver service dispatch routine table entry is determined not to indicate a rootkit. Processing transitions from ROUTINE ADDRESS POINTER WITHIN ALLOCATED MEMORY ADDRESS RANGE? check operation 712 to a LAST CRITICAL DRIVER SDRT ENTRY? check operation 718.

In LAST CRITICAL DRIVER SDRT ENTRY? check operation 718, a determination is made whether the critical driver service dispatch routine table entry located in operation 708, i.e., the current critical driver service dispatch routine table entry, is the last critical driver service dispatch routine table entry in the critical driver service dispatch routine table.

When the current critical driver service dispatch routine table entry is the last critical driver service dispatch routine table entry in the critical driver service dispatch routine table ("YES"), processing transitions from LAST CRITICAL DRIVER SDRT ENTRY? check operation 718 to an EXIT operation 720, with processing exiting method 700.

Alternatively, when the current critical driver service dispatch routine table entry is not the last critical driver service dispatch routine table entry in the critical driver service dispatch routine table ("NO"), processing transition from LAST CRITICAL DRIVER SDRT ENTRY? check operation 718 and returns to LOCATE CRITICAL DRIVER SDRT ENTRY operation 708, with a next critical driver service dispatch routine table entry being located in the critical service dispatch routine table.

Referring again to ROUTINE ADDRESS POINTER WITHIN ALLOCATED MEMORY ADDRESS RANGE? check operation 712, when the routine address pointer identifies an address location not within, i.e., outside, the allocated memory address range ("NO"), the critical driver service dispatch routine table entry is determined to indicate a rootkit. From ROUTINE ADDRESS POINTER WITHIN ALLOCATED MEMORY ADDRESS RANGE? check operation 712 processing transitions to a TAKE PROTECTIVE ACTION operation 714.

In TAKE PROTECTIVE ACTION operation 714, protective action is taken. For example, in one embodiment, the critical service dispatch routine table entry is copied to a text file for later analysis. In another embodiment, the critical service dispatch routine table entry is removed. In one embodiment, the user is prompted for input prior to taking protective action, e.g., the user is asked for permission to take protective action.

From TAKE PROTECTIVE ACTION operation 714, processing optionally transitions to a NOTIFY operation 716, or, if optional NOTIFY operation 716 is not performed, directly to LAST CRITICAL SDRT ENTRY? check operation 718 as earlier described.

In optional NOTIFY operation 716, a user of host computer system 102 and/or a system administrator are notified that protective action has been taken on host computer system 102. The user and/or system administrator can be notified using any one of a number of techniques, such as by using a pop up window, by writing to a file, and/or otherwise by logging the event. Further, a notification can be provided to a security center. From optional NOTIFY operation 716, processing transitions TO LAST CRITICAL SDRT ENTRY? check operation 718 as earlier described.

Referring again to FIG. 1, in one embodiment of the invention, rootkit prevention application 106 is in computer memory 112. As used herein, a computer memory refers to a volatile memory, a non-volatile memory, or a combination of the two.

Although rootkit prevention application 106 is referred to as an application, this is illustrative only. Rootkit prevention application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, rootkit prevention application 106 is implemented as a system level, e.g., kernel mode, driver.

While embodiments in accordance with the present invention have been described for a client-server configuration, an embodiment of the present invention may be carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, rootkit prevention application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the functionality of rootkit prevention application 106 in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionality of rootkit prevention application 106 in accordance with one embodiment of present invention can be implemented in a wide variety of computer system configurations. In addition, the functionality of rootkit prevention application 106 could be stored as different modules in memories of different devices.

For example, rootkit prevention application 106 could initially be stored in server system 130, and then as necessary, a portion of rootkit prevention application 106 could be transferred to host computer system 102 and executed on host computer system 102. Consequently, part of the functionality of rootkit prevention application 106 would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, rootkit prevention application 106 is stored in memory 136 of server system 130. Rootkit prevention application 106 is transferred over network 126 to memory 112 in host computer system 102. In this embodiment, network interface 138 and I/O interface 110 would include analog modems, digital modems, or a network interface card. If modems are used, network 126 includes a communications network, and rootkit prevention application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer implemented method comprising:
  executing computer code, stored in a memory of a computer system, on a processor of said computer system, wherein said executing prevents installing a rootkit, on said computer system, through operations at least including:
  identifying currently loaded drivers on said computer system;
  stalling a call to a driver load function, said call including an associated driver object;
  determining whether said call identifies a currently loaded driver;
  upon a determination that said call does not identify a currently loaded driver, determining whether said call is associated with a new device detection on said computer system;
  upon a determination that said call is not associated with said new device detection, determining whether said driver object is indicative of a rootkit; and
  upon a determination that said driver object is indicative of a rootkit, taking protective action to prevent said rootkit installation.

2. The computer implemented method of claim 1 further comprising:
  providing a notification to a user.

3. The computer implemented method of claim 1 further comprising:
  upon a determination that said call identifies a currently loaded driver, allowing said call to continue to said driver load function.

4. The computer implemented method of claim 1 further comprising:
  upon a determination that said call is associated with said new device detection on said computer system, allowing said call to continue to said driver load function.

5. The computer implemented method of claim 1 further comprising:
  upon a determination that said driver object is not indicative of a rootkit, allowing said call to continue to said driver load function.

6. The computer implemented method of claim 1 further comprising:

generating a loaded driver database, wherein each entry in said loaded driver database identifies a different currently loaded driver.

7. The computer implemented method of claim 6 wherein said determining whether said call identifies a currently loaded driver comprises:
    determining whether said driver object identifies an entry in said loaded driver database.

8. A computer implemented method of claim 1 wherein said determining whether said call is associated with a new hardware installation on said computer system further comprises:
    determining whether a new device detection flag is set to indicate a new device detection on said computer system.

9. The computer implemented method of claim 1 further comprising:
    stalling a call to a new device detection function in a hardware abstraction layer of said computer system;
    setting a new device detection flag to indicate detection of a new device installation; and
    releasing said call to said new device detection function.

10. The computer implemented method of claim 9 wherein upon a determination that said call is associated with said new hardware installation on said computer system, said method further comprising:
    clearing said new device detection flag to indicate no detection of a new device installation.

11. A computer implemented method of claim 1 wherein said determining whether said call is associated with a new device detection on said computer system further comprises:
    determining whether a new device detection flag is set to indicate a new device detection on said computer system.

12. The computer implemented method of claim 1 wherein said determining whether said driver object is indicative of a rootkit further comprises:
    determining whether said driver object is digitally signed;
    upon a determination that said driver object is not digitally signed, determining whether said driver object is a hardware related driver;
    upon a determination that said driver object is not a hardware related driver, determining whether said driver object is obfuscated; and
    upon a determination that said driver object is obfuscated, determining said driver object is indicative of a rootkit.

13. The computer implemented method of claim 12 further comprising:
    upon a determination that said driver object is digitally signed, determining said driver object is not indicative of a rootkit.

14. The computer implemented method of claim 12 further comprising:
    upon a determination that said driver object is a hardware related driver, determining said driver object is not indicative of a rootkit.

15. The computer implemented method of claim 12 further comprising:
    upon a determination that said driver object is not obfuscated, determining said driver object is not indicative of a rootkit.

16. The computer implemented method of claim 12 wherein said determining whether said driver is obfuscated includes determining whether said driver object is at least one of a group consisting of encrypted, packed, wrapped, and multiply compressed.

17. A method comprising:
executing computer code, stored in a memory of a computer system, on a processor of said computer system, wherein said executing includes operations at least including:
    locating a service descriptor table (SDT) address pointer to a service descriptor table on said computer system, wherein said SDT address pointer is to be used as a reference service descriptor table (SDT) address pointer;
    storing a copy of said SDT address pointer as a reference SDT address pointer;
    enumerating process threads currently running on said computer system;
    locating an enumerated process thread;
        locating an enumerated process thread service descriptor table (SDT) address pointer, in a service description table field in said enumerated process thread, to a service descriptor table for said enumerated process thread;
    determining whether a rootkit is indicated in said enumerated process thread based upon a comparison of said enumerated process thread SDT address pointer and said reference SDT address pointer, wherein upon said enumerated process thread SDT address pointer and said reference SDT address pointer being different, a rootkit is indicated in said enumerated process thread by said enumerated process thread SDT address pointer; and
    upon a determination that said rootkit is indicated in said enumerated process thread, taking protective action to protect said computer system.

18. A computer implemented method comprising:
executing computer code, stored in a memory of a computer system, on a processor of said computer system, wherein said executing includes operations at least including:
    stalling a call to a local descriptor table (LDT) add entry function, said call including an associated local descriptor table (LDT) entry;
    determining whether a rootkit is indicated in said associated LDT entry based upon whether an S flag in said LDT entry indicates kernel mode and whether a descriptor privilege level (DPL) indicates a user mode privilege;
    upon a determination that said S flag indicates kernel mode and said DPL indicates a user mode privilege, determining said rootkit is indicated in said associated LDT entry; and
    upon a determination that said rootkit is indicated in said associated LDT entry, taking protective action to protect said computer system.

19. A computer implemented method comprising:
executing computer code, stored in a memory of a computer system, on a processor of said computer system, wherein said executing includes operations at least including:
    locating a local descriptor table (LDT) of a computer system, said local descriptor table including one or more local descriptor table (LDT) entries;
    locating an LDT entry in said LDT;
    determining whether a rootkit is indicated in said LDT entry based upon whether an S flag in said LDT entry indicates kernel mode and whether a descriptor privilege level (DPL) indicates a user mode privilege;

upon a determination that said S flag indicates kernel mode and said DPL indicates a user mode privilege, determining said rootkit is indicated in said LDT entry; and upon a determination that said rootkit is indicated in said LDT entry, taking protective action to protect said computer system.

20. A computer implemented method comprising:

executing computer code, stored in a memory of a computer system, on a processor of said computer system, wherein said executing includes operations at least including:

locating a critical driver on said computer system;

determining an allocated memory address range of said critical driver;

locating a critical driver service dispatch routine table (SDRT) associated with said driver;

locating a critical driver service dispatch routine table (SDRT) entry in said critical driver SDRT, said critical SDRT entry including a critical driver SDRT entry routine address pointer;

determining whether a rootkit is indicated in said critical driver SDRT entry based upon whether said critical driver SDRT entry routine address pointer is within said allocated memory address range;

upon a determination that said critical driver SDRT entry routine address pointer is not within said allocated memory address range, determining said rootkit is indicated is indicated in said critical driver SDRT entry; and upon a determination that said rootkit is indicated in said critical driver SDRT entry, taking protective action to protect said computer system.

\* \* \* \* \*